UNITED STATES PATENT OFFICE.

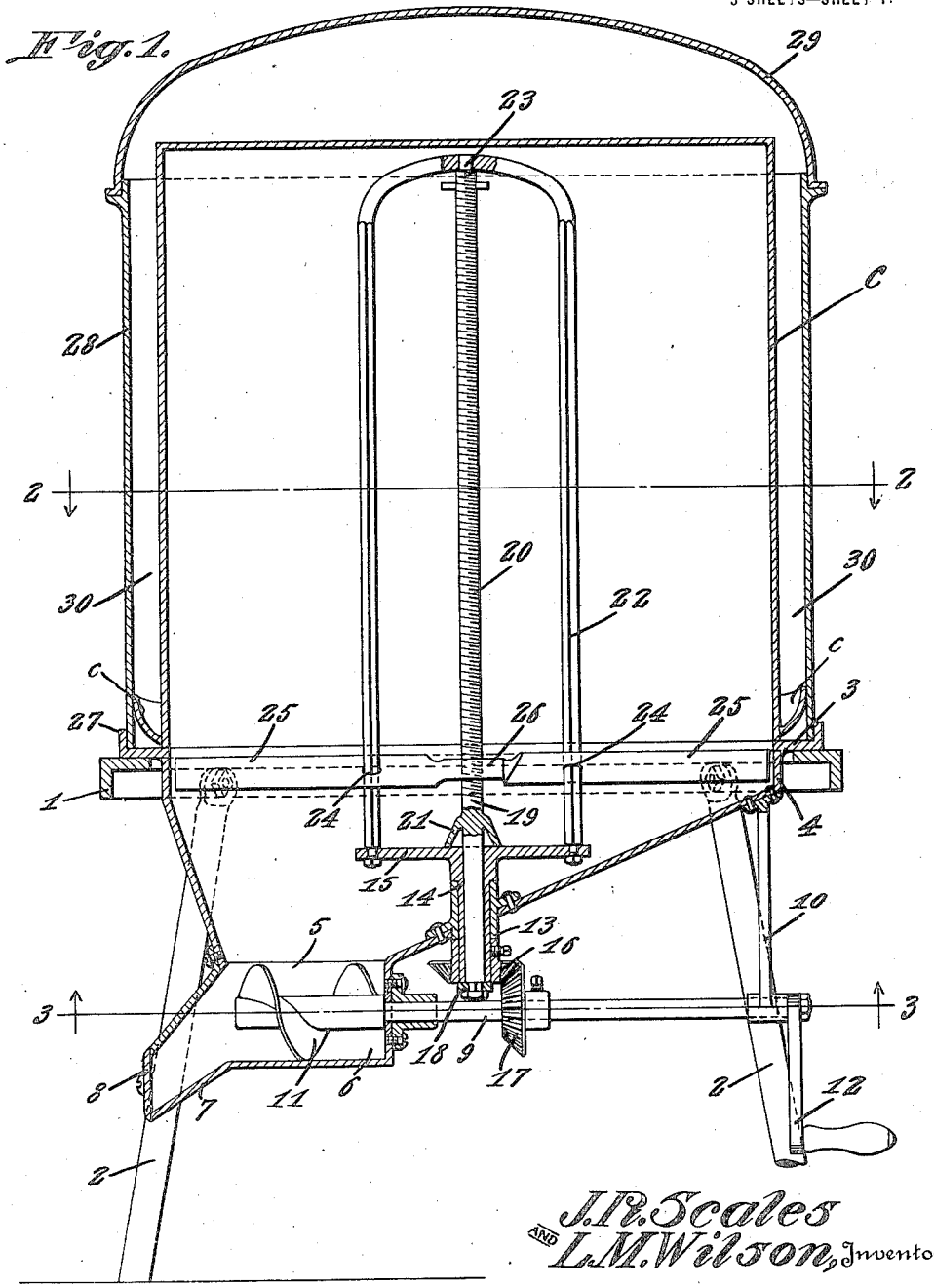

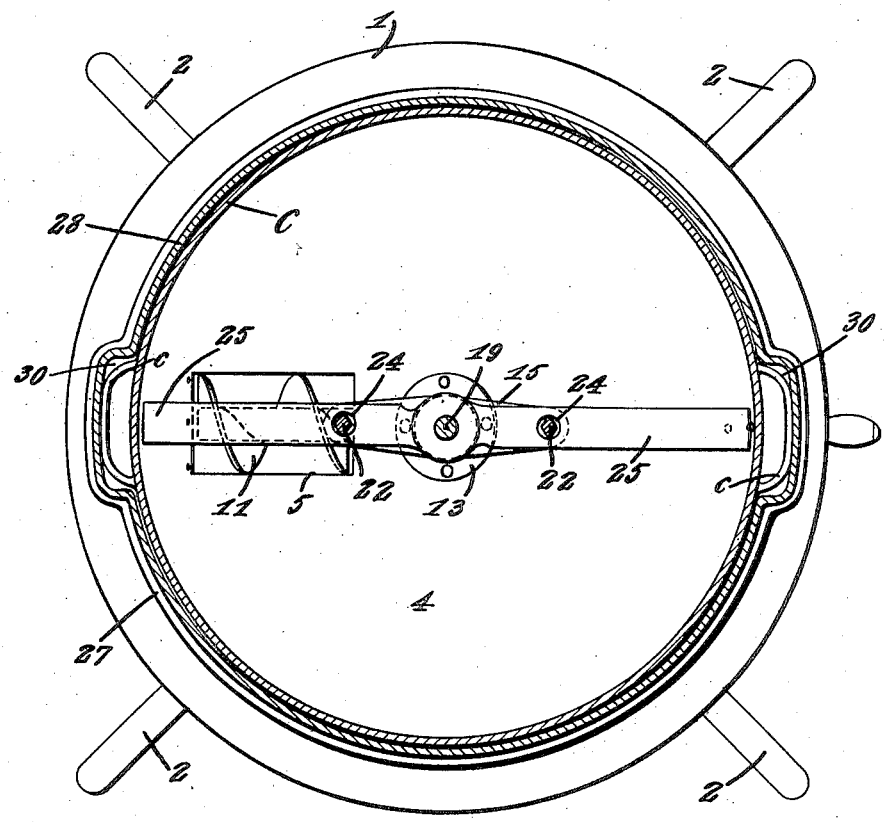

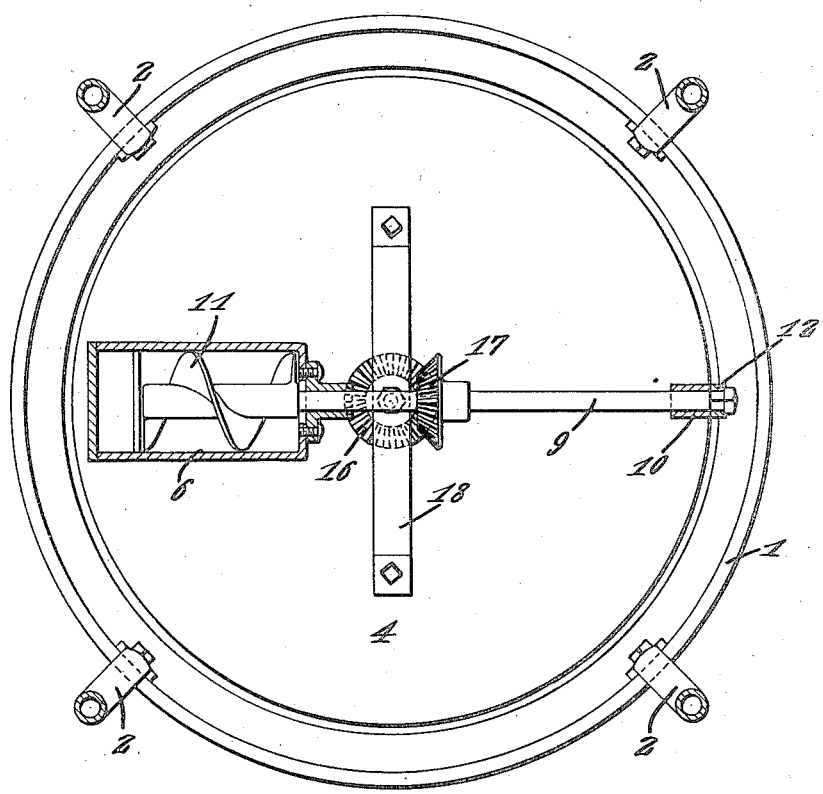

JOHN R. SCALES, OF INDIANAPOLIS, AND LORAIN M. WILSON, OF BLOOMINGTON, INDIANA.

DISPENSING APPARATUS.

1,400,770.      Specification of Letters Patent.      Patented Dec. 20, 1921.

Application filed April 21, 1921. Serial No. 463,352.

*To all whom it may concern:*

Be it known that we, JOHN R. SCALES and LORAIN M. WILSON, citizens of the United States, residing, respectively, at Indianapolis and Bloomington, in the counties respectively, of Marion and Monroe, State of Indiana, have invented a new and useful Dispensing Apparatus, of which the following is a specification.

This invention relates to dispensing apparatus, its primary object being to provide means whereby peanut butter or like material can be removed from its container and dispensed in desired quantities at will.

A further object is to provide dispensing apparatus which is simple and compact in construction, which keeps the material fully protected at all times, and which can be operated easily.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a central vertical section through the apparatus.

Fig. 2 is a section on line 2—2, Fig. 1.

Fig. 3 is a section on line 3—3, Fig. 1.

Referring to the figures by characters of reference 1 designates a ring like base mounted on supports 2. This base is adapted to be engaged by and support an annular flange 3 extending around the upper portion of a hopper 4, this hopper being extended through the base 1 and having an outlet 5 toward which all portions of the bottom of the hopper are inclined. This outlet opens into a trough 6 having a discharge pipe 7 provided with a closure 8. A shaft 9 is journaled in one end of the trough and also within a supporting bracket 10 and that portion of the shaft located within the trough is provided with a feed worm 11. A crank 12 or other suitable means may be provided for rotating the shaft 9 so that any material directed into the trough 6 can be forced by the worm toward and into the spout 7.

A bearing sleeve 13 is secured in the bottom of the hopper and journaled therein is a tubular shaft 14 provided at its upper end and above the bottom of the hopper with a cross-head 15. The lower portion of this tubular shaft has a gear 16 secured to it, said gear meshing with the gear 17 secured to the shaft 9. Thus when shaft 9 is rotated motion will be transmitted through the gears to the cross-head 15.

A cross strip 18 is secured to the bottom of the hopper and extends transversely under the tubular shaft 14. Secured to this strip so as to be held against rotation is the lower end of a stem 19 which extends upwardly through the tubular shaft 14 and upwardly beyond the level of the base 1. The greater portion of this shaft is screw threaded as indicated at 20 and a collar 21 is provided on the stem and laps the cross-head 15 so as to prevent the stem from shifting longitudinally in one direction relative to the tubular shaft 14.

An elongated yoke 22 is secured at its terminals to the cross-head 15 and has its arms parallel with and spaced equal distances from the stem 19 the intermediate portions of this yoke being journaled on the upper end of the stem as indicated at 23. The arms of the stem can be made angular in cross section and these arms extend through openings 24 formed within oppositely extending inclined blades 25. The blades are connected at their inner ends as shown at 26, the connecting portions being mounted on and engaging the threaded portion 20 of the stem 19.

The flange 3 is provided at its periphery with an upstanding rib 27 and detachably mounted on the base is a housing 28 the lower end of which is surrounded by the rib while the upper end is adapted to support a cover 29. The housing 28 can be provided with oppositely disposed outwardly offset portions forming channels 30.

In using the apparatus herein described the cover 29 is removed or, if preferred, the entire housing 28 can be taken off of the base supported flange 3. A container C, filled with the material to be dispensed, is placed in an inverted position upon the flange 3 with the stem 19 and the yoke 22 projecting upwardly into the material and with the blades 25 located below the surface of the contents of the container. The housing 28 can then be replaced so that the handles c of the container will lie within the channels 30 after which the cover 29 can be placed in position. By rotating the shaft 9 motion will be transmitted to the tubular shaft 14 and also to the worm 11. When shaft 14 is revolved the yoke 22 rotates therewith and causes the inclined blades 25 also to rotate. The advancing edges of these blades will engage the surface portion of the contents of the container and shave off a thickness of the material so that it will fall into the hopper 4 and be directed to the trough 5. Here the worm 11 will compress the material in the spout 7 so that by opening the closure 8 a portion of the material can be ejected from the machine. As the blades 25 rotate they travel upwardly along the stationary threaded stem so that the material will be properly cut into by the blades during repeated rotations of the blades.

What is claimed is:—

1. In dispensing apparatus the combination with a hopper and expelling means mounted for movement within the hopper, of means for supporting an inverted container above the hopper, and means actuated by the operation of the expelling means for cutting material from the exposed surface of the contents of the inverted container and directing the same into the hopper.

2. In dispensing apparatus the combination with a hopper having an outlet and movable means for ejecting material to the outlet from the hopper, of means for supporting an inverted container above the hopper, and means operated by the actuation of the ejecting means for removing material from the exposed surface of the contents of the container and directing the same into the hopper.

3. In dispensing apparatus the combination with means for supporting a container in inverted position, of means movable over the exposed surface of the contents of the inverted container for removing the surface material, and means for automatically feeding said material removing means into the container.

4. In dispensing apparatus the combination with means for supporting a container in an inverted position, of means revoluble over the exposed surface of the contents of the inverted container for removing the surface portion of the material within the container, and means operated by the movement of said material removing means for feeding the same into the container during the actuation thereof.

5. In dispensing apparatus the combination with means for supporting a container in inverted position, of means mounted for rotation upon the exposed surface portion of the contents of the inverted container to remove a portion of said contents from the container, and means for automatically feeding the revoluble means into the container during the rotation thereof.

6. The combination with means for supporting an inverted container, and a stationary inverted stem projecting therefrom and into the container, of blades mounted for rotation on the stem and movable therealong, said blades operating to cut away the surface portion of the exposed end of the contents of the container.

7. In dispensing apparatus the combination with means for supporting a container in an inverted position, of a blade mounted for rotation across the exposed surface of the contents of the container, means for rotating said blade to engage and cut off the surface portion of the contents, and means operated by such rotation of the blade for feeding the blade into the container.

8. In dispensing apparatus the combination with means for supporting a container in an inverted position, of a blade mounted for rotation across the exposed surface of the contents of the container, means for rotating said blade to engage and cut off the surface portion of the contents, and means operated by such rotation of the blade for feeding the blade into the container, a hopper for receiving the material disengaged by the blade, and means actuated by the rotation of the blade for ejecting material from the hopper.

9. In dispensing apparatus the combination with means for supporting an inverted container, of a stationary threaded stem a blade mounted for rotation about the stem, means for rotating the blade to engage the surface portion of the exposed part of the contents of the container to remove said surface portion, said stem constituting means for feeding the blade into the container during the rotation of the blade.

10. In a dispensing apparatus the combination with means for supporting a container in an inverted position, of a yoke mounted for rotation and adapted to project into the inverted container, a stationary threaded stem, blades slidably engaging the yoke and mounted for rotation above the stem, said blades being slidable along the yoke, means for rotating the yoke to actuate the blades for engaging the surface portion of the exposed end of the contents of the container thereby to remove said exposed portion and to feed the blades into the container.

11. In dispensing apparatus the combination with a hopper having an outlet and means for supporting the container in an inverted position above the hopper, of a cross-head, a yoke revoluble therewith, means for rotating the yoke, blades connected to and slidable on the yoke for engaging and removing the exposed portion of the contents of the container, and means operated by the rotation of the blades for feeding them into the container.

12. In vending apparatus the combination with a hopper, of a housing mounted thereon, for the reception of an inverted container, a stationary threaded cam upstanding from the hopper and projecting into the housing, a yoke revoluble about the cam, blades slidably mounted on the yoke and engaging the stem, and means for rotating the yoke to revolve the blades and to feed the blades into the housing and into the inverted container supported in the housing.

In testimony that we claim the foregoing as our own, we have hereto affixed our signatures in the presence of two witnesses.

JOHN R. SCALES.
LORAIN M. WILSON.

Witnesses:
 CARL E. WOOD,
 ANNETTE McCRIGHT.